Figure 1:
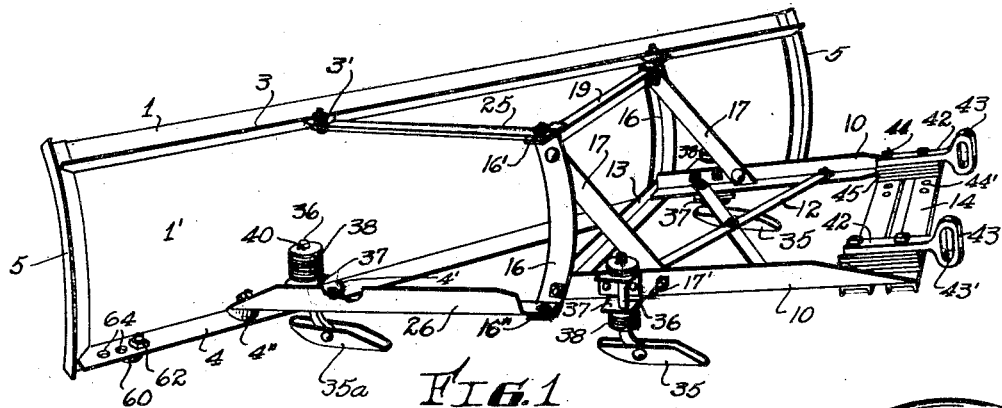

Aug. 1, 1933.  E. B. MEYER  1,920,475
TRACK CLEARING IMPLEMENT
Filed July 13, 1931  2 Sheets-Sheet 1

Inventor
Edward B. Meyer
By Macklin, Soule & Leonard
Attorney

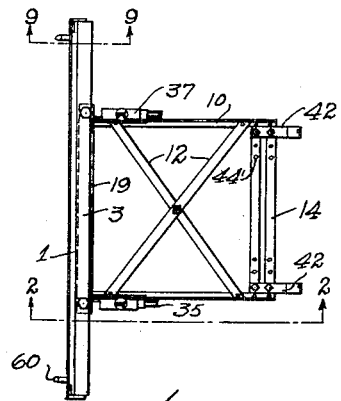
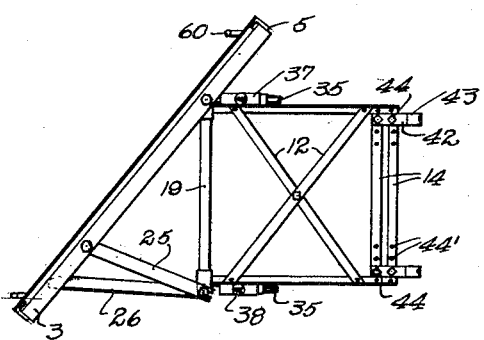
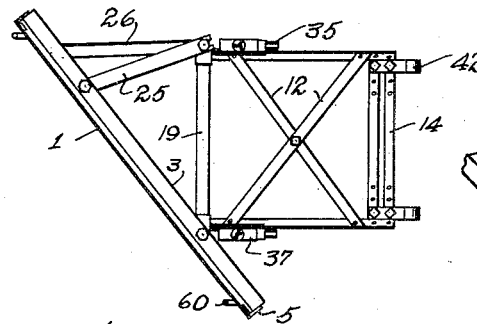
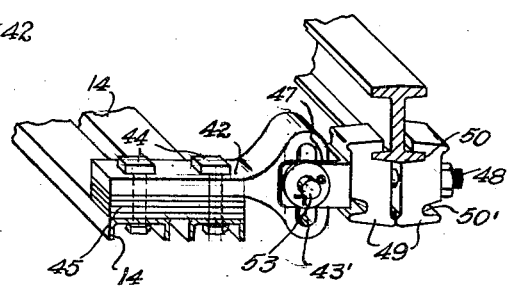
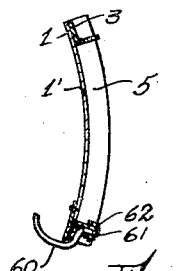
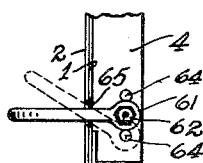

Patented Aug. 1, 1933

1,920,475

UNITED STATES PATENT OFFICE 1,920,475

TRACK CLEARING IMPLEMENT

Edward B. Meyer, Cleveland, Ohio

Application July 13, 1931. Serial No. 550,431

14 Claims. (Cl. 37—42)

The present invention relates to a snowplow or shovel of the class of road clearing equipment adapted to be detachably associated with a motor-driven vehicle. The form shown in the drawings is a one-blade apparatus of that type adapted to be pushed ahead of such vehicle.

The essential objects include the provision of a track clearing mechanism which will be efficient in operation in clearing a roadway, which will not unnecessarily strain the mechanism of the motor vehicle which operates it, which is of unusually light weight, and which may be very easily, quickly and firmly attached to an automobile, for example, and quickly detached therefrom when desired.

A specific object is to provide a snow clearing mechanism of the type above referred to, which will be self-supporting in operating position, wherefore it will impose no vertical load on the vehicle which operates it, and may be operatively associated with such vehicle without loss of time and more easily than in the case of previously known devices of this class.

A further object is to provide an improved attaching device for an implement adapted to be operated by a motor vehicle, and specifically one adapted to be attached to the front axle of an automobile.

Other specific objects include the provision of an improved attachment device for securing an apparatus of the class described to an automobile front axle, which will accommodate axles of various sizes and distances from the ground or general supporting surface.

Another object is to provide a simple, effective device to support the blade of a snowplow or shovel in working position, providing clearance for irregular surfaces, such as cobblestone pavements or stony or rough frozen ground, etc.

A further object is to provide runner devices for a plow or shovel blade, which are adjustably arranged to operate effectively in a number of different positions of the blade.

Other objects include the provision of an unusually strong and rugged but light weight frame for a snowplow or like blade and, specifically, an improved, effective device for changing the angle between the blade and path of movement of the vehicle to adjust or reverse the same (for selective right or left hand plowing, or for that matter plowing or shoving at any angle).

Still another object is to provide an improved, simplified and effective device for suspending an implement, such as a snowplow or shovel in an inoperable position on a motor vehicle.

Further novel features and advantages of the invention will become apparent from the following description relating to the accompanying drawings, wherein I have shown my preferred form. The essential characteristics are summarized in the claims.

Figures 2, 3:
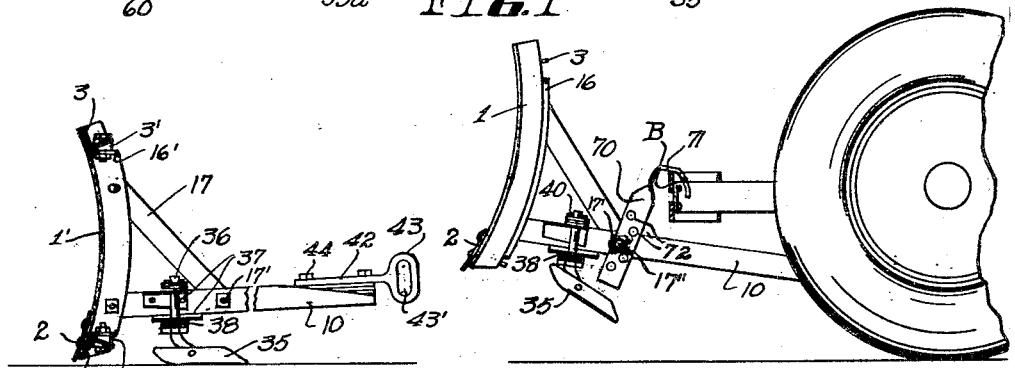
Figure 4:
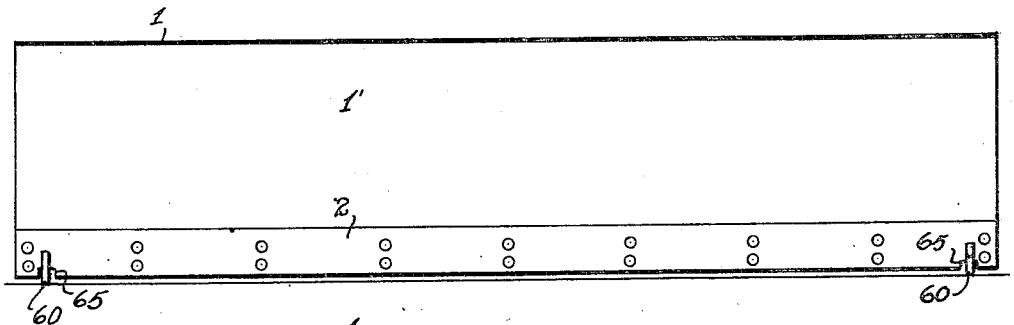

In the drawings, Fig. 1 is a perspective view of the entire mechanism detached from the motor vehicle; Fig. 2 is a sectional view thereof but taken substantially along the lines 2—2 on Fig. 5; Fig. 3 is a side elevation of the implement in suspended or carrying position on the motor vehicle; Fig. 4 is a front elevation of the moldboard; Figs. 5, 6 and 7 are plan views showing the moldboard in various adjustments with relation to the main frame; Fig. 8 is a perspective view showing the manner in which the main frame is coupled with the chassis of an automobile; Fig. 9 is a detail view showing the preferred arrangement of skids or guard rails on the moldboard, and Fig. 10 is a detail view thereof showing particularly the manner in which the skids are adjusted in accordance with the position of the moldboard with respect to the main frame.

Referring again to the drawings, 1 indicates the main plowing element or moldboard. The preferred curve or forward dish of the moldboard is, as shown in Fig. 2, but may, of course, be greatly varied, the object being to remove snow by pushing the same and at the same time rolling it, which of course makes the actual work of moving the snow much easier.

The moldboard, as shown, comprises a horizontally elongated piece 1' of sheet steel of suitable weight and which is suitably longitudinally reinforced near its top and bottom edges by stiffening members, preferably structural angles designated 3 and 4, as shown. Also, the ends of the sheet are braced and held in shape by suitable structural angles 5 curved to fit the moldboard. At the lower front edge of the moldboard is a hardened steel blade or cutting strip 2. This is preferably made separately from the moldboard and suitably bolted or riveted thereto, the fastening members passing through both the sheet 1' and the lower reinforcing member 4.

One of the features of the present invention is the manner in which the moldboard is supported, preferably clear of the ground for the snow moving operation, and with the necessary supporting frame in position for attachment to chassis parts of a motor vehicle without having to lift any portion of the plow. This arrangement includes a main frame, comprising longitudinal sills 10 with suitable cross and diagonal braces at 12, 13 and 14. The sills, at their forward ends, have rigidly fastened thereto upright structural members 16, angles as shown, braced by suitable diagonal struts 17 and to which the moldboard and associated parts are adjustably secured. The uprights are transversely braced both by the members 13 and an upper cross brace 19.

Suitably carried on the frame and preferably by the cross members 14 are brackets 42, to be hereinafter described in detail, by which the frame is coupled with the chassis of a car in such manner that the plow and frame are shoved ahead of the car to clear the snow in the path of the moldboard.

The members 16 are preferably angles and at both ends of each angle, one of the flanges is bent outwardly (see 16' and 16'') to support the moldboard through the medium of the rearwardly turned flanges of the angles 3 and 4. The latter flanges diverge and are therefore provided with fillers or pads at 3' and 4' for flat contact with the flange portions 16' and 16''. Suitable fastening bolts pass through the overlying flange portions and the fillers. The openings in the flanges and pads and the fastening bolts constitute hinge members about which the moldboard is swung for right and left hand movement of material from the track, see Figs. 5 and 7.

It will be noted by reference to Figs. 1 and 5 that when the moldboard is positioned normal to the path of travel of the plow, the longitudinal reinforcing angle members 3 and 4 of the moldboard nest with relation to the cross tie members 13 and 19 of the main frame. I thus obtain added stiffness when directly shoving on snow, particularly for the larger central portion of the moldboard. In operation, the nesting relationship of the angles 3 and 4 with the cross members 19 and 13 respectively, prevents any rearward bowing of the moldboard. It is obvious that this arrangement relieves considerable shearing stress on the securing bolts which couple the moldboard and frame.

Positioning the moldboard for right and left hand plowing is provided for by the addition of struts shown at 25 and 26, each connecting one of the longitudinal brace members of the plow to a respective flange portion 16' or 16'' of the respective uprights 16. These struts, as shown, are entirely detachable from both the moldboard and the frame, so that the position may be reversed for right and left hand plowing, whichever is desired.

The strut 25 is attached to the moldboard at the same points to which the flange of the reinforce 3 is attached to the flange 16' of the uprights 16, but the lowermost struts 26 are secured farther toward the end of the moldboard at pads 4'', one being shown in Fig. 1. Thus, when the mechanism is adjusted for either right or left hand plowing, strain on the main frame parts (referring to the members 10, 12, 13 and 14) is reduced, by the angular relationship of the upper and lower struts 25 and 26. As the lowermost strut 26, takes the greater part of the load, the forces are transmitted, for the most part, directly and equally to the frame sills 10. Moreover, the attachment of the struts 25 and 26 to the moldboard at spaced points along its length divides the bending load on the moldboard and renders the outlying structure, namely, the parts 25, 26 and the outer part of the moldboard, much stiffer.

It will be further noted from Figs. 2 and 3, that the low slung position of the sill members 10 apply the shoving forces of the driving vehicle directly to the lower section of the moldboard where the imposed load of the snow is greatest. This is notwithstanding the adjustment of the moldboard in its angular relation to the main frame, for during right or left hand plowing the lower strut 26 becomes simply a continuation of one of the members 10.

Referring again to Figs. 1 and 2, it will be noted that the frame members 10 are each provided with a pivoted vertically rocking support or castor, each including a shoe 35 and a vertical shaft 36 in suitable bearings 37, the shaft being adjusted vertically by reason of the position of a number of washers 38. This adjusting arrangement comprises suitable shoulders, below the lowermost washers and a pin or other suitable securing device 40 above the uppermost washers. If it is desired to raise or lower any one of the shoes 35, then as many of the washers are removed and reversed in position above or below the bearings 37, as may be necessary to support the frame at the required or desired height. A third pivoted rocking castor shoe at 35a is attached to the frame member 26 in the same manner as the shoes 35 are secured to the frame members 10, completing a three-part support by which the plow is self-supporting and requires no lifting to associate it with the motor vehicle through suitable attachment devices to be presently described.

It is obvious that the arrangement just described may be considerably modified. For example, instead of supporting the shoe 35a on the strut 26, this shoe may be secured directly to the moldboard on any suitable bracket arrangement. While it is preferred to remove the struts 25 and 26, when these are not in use, they may instead be modified to be swung to inactive positions and carried on the frame or the moldboard.

The preferred arrangement for securing the plow to the front axle of an automobile is shown in Figs. 1 and 8. This arrangement is as follows:

Secured to the main frame of the plow, preferably on top of the cross members 14, are a pair of brackets 42 having enlarged heads 43 vertically slotted at 43'. The brackets are supported on shims 45, for height adjustment by removing and replacing the shims. The shims 45 may be placed above or below the cross members 14 or part above and part below, as required. Likewise the brackets 42 may be disposed above or below the cross members. Transverse adjustment of the brackets 42 may also be effected by choosing the position of the securing bolts 44—a series of openings at 44' being provided in the cross members 14. The enlarged vertical slotted heads 43 are adapted to be embraced by bifurcated heads 47 on respective clamping bolts 48, which pass through separate clamp jaws 49 with registering apertures to receive the bolts 48 and suitably recessed as at 50 to firmly engage the lowermost flanges of the usual I section front axle.

For greater adaptability, the jaws may be made reversible and may have larger or smaller recesses at 50' to receive and clamp an axle with wider flanges than those shown, for example. It will be seen that the clamp assembly 47, 49, etc. may be left on the axle of the car at all times, and when it is desired to couple the snowplow with the car, the car is driven forwardly to the plow, with the heads 47 embracing the heads 43. By virtue of the vertically elongated slots 43', the insertion of a suitable coupling pin 53 through suitable registering openings in the head 47 and the slots 43', is an easy matter, notwithstanding variation in the relative height from the ground of the clamp assembly and attachment brackets 42.

In order to protect the blade of the snowplow from damage in running over a curb or other abruptly rising surface, I provide skid guards 60 near the two outer ends of the moldboard and on the lower edge thereof, see Figs. 5 to 7 and 9 to 10. These have attaching eyes at 61, arranged to be held in position by suitable bolts 62, which are secured in one of the three openings 64, Figs. 1 and 10, in the structural angle 3, depending on the position of the moldboard with respect to the plow. For example, if the moldboard is positioned perpendicular to the frame, as in Fig. 5, then the bolts pass through the intermediate openings, and for angular positioning of the moldboard the eyes are secured at the selected extremes openings 64. By this means, the skid guards are adjusted to extend in the direction of movement of the frame and vehicle. Placement of the bolts 62 in selected openings 64 determines the direction of the skid guards because intermediately of their ends, the skid guards are embraced by downwardly-facing enlarged notches 65 in the lower edge of plow blade, it being noted in Fig. 10 that there is enough clearance between the skid guards and notches to allow the skid guards to be swung to the three positions noted above.

Referring to Fig. 3, it will be seen that the whole mechanisms may be easily and quickly suspended from the bumper or other outrigging on a motor-driven vehicle without disturbing the attachment devices connecting the implement to the vehicle. The device may be greatly modified and may, in fact, comprise chains. As shown, the device consists in the provision of hangers 70 having hooked upper ends as at 71 and depending portions with a staggered series of openings as at 72, adapted to engage suitable bolts or pins on the main frame. Preferably, the bolts at 17' which connect the diagonal struts 17 to the frame members 10 are extended, as shown in Fig. 1, and when it is desired to suspend the mechanism in carrying position, the hooked ends 71 are hung over the bumper, indicated at B (Fig. 3), and one of the openings 72 in both hook members slid over the respective projecting ends of the bolts 17'. When the hangers are secured as shown in Fig. 3, the implement is securely locked against jolting out of carrying position because the sill members 10 of the implement frame clear the lower surfaces of the bumper by a less distance than the length of the free downturned ends of the hooks. The depending portions of the hangers may be quickly secured in place by cotter pins 17" engaging the ends of the bolts 17'.

I claim:

1. In an impelment of the class described, a moldboard blade adapted to operate either broadside or at an acute angle to the direction of movement of the blade, a frame having blade engaging surfaces at its front end arranged to engage the blade at materially spaced elevations and spaced apart horizontally material distances and adapted to operatively engage the blade simultaneously for shoving the same during such broadside operation, a hinge connection adjacent one of said surfaces between the frame and blade, and means for rigidly securing the blade to the frame while swung about said hinge connection in the acute angle operating position aforesaid.

2. In an implement of the class described, a moldboard blade, a substantially rigid frame with forwardly disposed and horizontally spaced portions, each adapted to directly engage the blade to shove the same for broadside operation on the material to be moved, a hinge connection between the blade and one of said portions of the frame, and a rigid strut adapted to be positioned between the other of said portions and the blade for securing the blade in another operating position, namely swung about said hinge connection, for laterally moving and shoving the material.

3. In a track clearing implement, a moldboard, a frame adapted to support the moldboard and adapted for association with the chassis of a motor vehicle, a strut connection between the moldboard and frame whereby the moldboard may be positioned with a portion thereof in spaced relation to the frame and disposed diagonally thereof for lateral movement of material from the track, said strut connection including a strut member and a ground engaging member carried thereby adapted to support a portion of the moldboard clear of the ground.

4. In a track clearing implement, a frame adapted to be associated with the chassis of a motor vehicle, a moldboard blade secured to the front end of the frame on two pivot axes spaced transversely of the direction of movement of the frame, and strut means to reversibly position the blade for plowing at different angles, said strut means being adapted to be connected with the frame at a selected one of said pivot axes.

5. In a track clearing implement, a moldboard blade, a frame having an upstanding portion at its front end to support the blade, means to secure the blade in position on the frame and close thereto, comprising two sets of detachable hinge members spaced transversely of the direction of movement of the implement, and means to support the blade in a diagonal position with relation to the frame comprising strut means adapted to be positioned between the blade and frame with the hinge members of one set detached from each other and the blade swung about the other set of hinge members.

6. In a track clearing implement, a moldboard, means to supoprt the same, a recess in the lower edge of the moldboard and elongated curved skid guard device extending under the moldboard in the embrace of the recess and means for securing one end of the guard to the moldboard in a plurality of positions whereby the guard may extend parallel to the direction of movement of the moldboard in respective different angular positions of the latter.

7. In a track clearing implement, a moldboard, a frame adapted to support the moldboard, vertically spaced connections between the moldboard and frame for supporting a portion of the moldboard directly adjacent the frame, and means for supporting another portion of the moldboard in spaced relation to the frame for laterally moving material from the track, comprising a pair of struts having substantially vertically aligned connections with the frame and horizontally spaced connections with the moldboard.

8. In a track clearing implement, a moldboard, a rigid frame for the moldboard, said frame including sill members arranged substantially parallel to the direction of movement of the implement and spaced transversely of said direction, means for securing a portion of the moldboard directly adjacent the frame and one of the sill members at vertically spaced points, and means for supporting another portion of the moldboard in longitudinally spaced relation to the frame and the other sill member, including strut devices, one of said struts extending substantially parallel to the last mentioned sill member, and means connected with the sill members opposite said moldboard connections for securing the frame to the running gear of a motor-driven vehicle in such manner that the vehicle shoves the member and frame substantially in line with the sill members.

9. In a track clearing implement of the class described, a single blade moldboard and frame, means on the frame for securing the frame to the running gear of a motor-driven vehicle, said means including a pair of brackets with vertically elongated openings and cooperating brackets adapted to be secured to such running gear, said last mentioned brackets being adapted to carry pins for engagement with the elongated openings, and means associated with the frame affording a three-point ground contact therefor and supporting the frame with the brackets thereof in such position that the brackets with their elongated openings float vertically with reference to said pins.

10. In a track clearing implement of the class described, a moldboard and frame, means on the frame including a pair of attachment brackets spaced transversely of the direction of plowing, a cooperating pair of brackets adapted to be secured to the running gear of a motor vehicle, vertically elongated openings in one pair of brackets, pins on the other pair of brackets arranged to engage the elongated openings and means whereby to raise and lower the said attachment brackets with reference to the frame, comprising a plurality of shims interposed between said attachment brackets and the frame.

11. In a track clearing implement of the class described, a moldboard and frame, said frame including longitudinal sill members and a transverse connecting member rigid therewith, a pair of brackets adapted to be secured to said transverse member in a plurality of positions for transverse adjustment of said brackets, and additional brackets adapted to be secured to the running gear of a motor vehicle and arranged to pivotally engage the first mentioned brackets for shoving the implement.

12. In a track clearing implement of the class described, a moldboard and frame, said frame having attachment devices at one end adapted to be pivotally secured to the running gear of a motor vehicle having a bumper and means to suspend the implement in an inoperative position, including a hanger device adapted to be secured to said frame, the upper end of the hanger device having a hook arranged to engage the bumper, and means to adjustably position the hanger vertically with reference to the frame.

13. In a track clearing implement, a moldboard and frame, means to pivotally connect the frame to the chassis of a motor vehicle having a bumper, with a portion of the frame underlying the bumper, a suspending device having a hook to engage the top surface of the bumper and overhang the same forwardly and rearwardly thereof and means to secure the said device to the frame to suspend the latter from such bumper with the frame spaced from the underside of the bumper a distance less than the effective vertical length of the free end of the hook, whereby supporting engagement of the hook with the bumper is insured.

14. In a track clearing implement of the class described, a moldboard and frame, means associated with the frame including two attachment brackets spaced transversely of the direction of plowing, means including two brackets adapted to cooperate with the aforesaid brackets and adapted to be secured to the running gear of a motor vehicle to shove said frame, two of said brackets carrying pins and the remaining two having slots to engage the pins, the first mentioned two brackets being adapted to be secured to said frame on selected surfaces above and below a rigid portion of the frame and there being shims to vary the height of said first mentioned brackets with reference to the cooperating brackets in either said selected position.

EDWARD B. MEYER.